United States Patent [19]

Ooumi et al.

[11] Patent Number: 4,962,480
[45] Date of Patent: Oct. 9, 1990

[54] MEMORY READING APPARATUS

[75] Inventors: Manabu Ooumi; Toshihiko Sakuhara; Tatsuaki Ataka, all of Tokyo, Japan

[73] Assignee: Seiko Instruments, Inc., Chiba, Japan

[21] Appl. No.: 243,514

[22] Filed: Sep. 12, 1988

[51] Int. Cl.$^5$ .................. G11C 13/00; G01N 23/00
[52] U.S. Cl. ................................ 365/151; 369/126; 250/306; 365/118
[58] Field of Search ............... 365/174, 244, 118, 151; 369/126, 132; 250/306; 346/158, 153.1

[56] References Cited

U.S. PATENT DOCUMENTS

| | | |
|---|---|---|
| 4,575,822 | 3/1986 | Quate .................................. 365/174 |
| 4,826,732 | 5/1989 | Kazan et al. .................... 369/126 X |
| 4,829,507 | 5/1989 | Kazan et al. ........................ 369/126 |

Primary Examiner—Joseph A. Popek
Attorney, Agent, or Firm—Spensley Horn Jubas & Lubitz

[57] ABSTRACT

An output section comprising a needle which has a fine tip portion. A data stored in a memory is read out by applying electrical stimulation between the tip portion of the needle and the memory. A memory reading apparatus enables non-contact reading on an atomic or molecular scale.

13 Claims, 8 Drawing Sheets

MEMORY READING APPARATUS

BACKGROUND OF THE INVENTION

The present invention relates to a memory reading apparatus.

In conventional memory reading devices, a magnetic head has been used for magnetically recorded mediums, such as a floppy disk, a magnetic tape, and an optical head has been used for mediums, such as an optical disk, an optomagnetic disk, etc.

According to such heads, however, a problem exists in that the memory cannot stand under a long time use due to a physical contact of the head with the memory. A further problem exists in that data cannot be read out of the memory unless a memory cell is made up of a predetermined number of atoms or molecules.

SUMMARY OF THE INVENTION

It is the primary object of the present invention to provide a memory writing apparatus by which the above-mentioned defect of the conventional technique is overcome and an improved memory reading apparatus which enables non-contact reading on an atomic or molecular scale.

In accordance with the present invention, there is provided a memory reading apparatus comprising an output section which comprises at least one needle having a fine tip portion, and control means for controlling the output section, wherely reading data stored in a memory at a high density is achieved. The control means comprises means for positioning the tip portion of the needle close to a surface of the memory, means for scanning the tip portion of the needle over the surface of the memory and means for controlling a between the tip portion of the needle and the surface of the memory during scanning. In the memory reading apparatus reading is carried out by applying an electrical stimulation between the tip portion of the needle and the memory.

DESCRIPTION OF THE PREFERED EMBODIMENTS

According to the present invention, a memory reading apparatus comprises at least one needle having a fine tip portion, and control means for controlling the output section. The control means comprises means for bringing the tip portion of the needle to close to the surface of a memory to thereby effect positioning, means for allowing the tip portion of the needle to scan the surface of the memory and means for controlling the distance between the tip portion of the needle and the surface of the memory during scanning. The needle may has a fine tip portion so that a tunnel current flows between the tip portion and the memory surface. The tip portion may be made of electrically conductive material or semiconductive material.

The present invention will now be described in detail with reference to the following.

(Embodiment 1)

Figure 1:
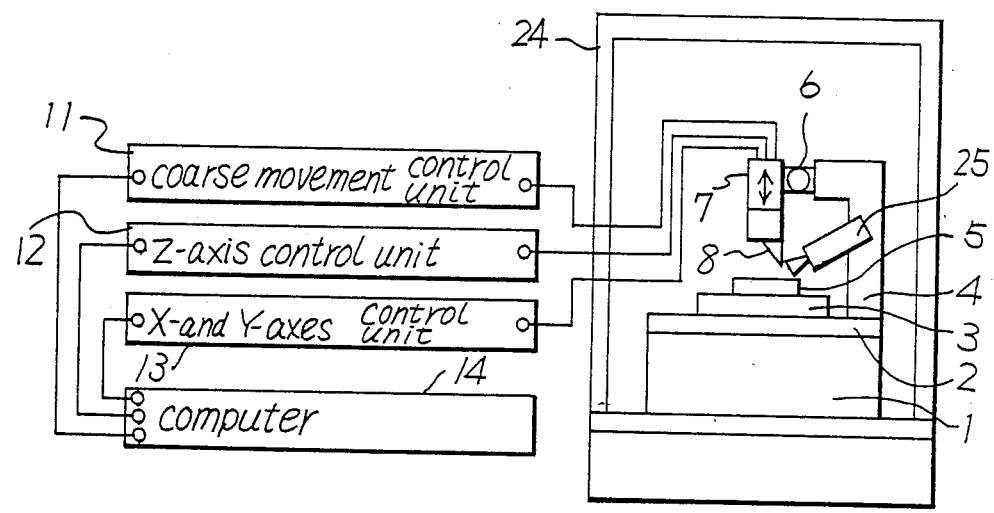
FIG. 1 is a schematic diagram showing a memory reading apparatus according to the present invention.

FIG. 1 shows a memory reading apparatus according to the present invention. On an anti-vibration stand 1, mounted is a fixed table 2 to which an arm 3 is fixedly secured, and to the arm 3 a needle operating unit 7 is attached. By turning a dial 6, the needle operating unit 7 is vertically moved for carrying out a Z-axis coarse positional adjustment of a probe tip of a needle 8 relative to a memory 5. For an X-Y surface coarse movement, an X-Y stage 3 and a coarse movement control unit 11 are provided. An optical microscope 25 attached to the arm 4 is used at the time when the needle 8 is coarsely positioned relative to the memory 5 An operation of the unit 7 over the X-Y surface is carried out by controlling a three-dimensional piezo-electric device assembled in the needle operating unit 7 with an X- and Y-axes control unit 13. Data stored in the memory 5 is read out by applying between the memory 5 and the needle 8 a predetermined voltage ranging from 1 to 100 mV. The coarse movement control unit 11, a Z-axis control unit 12 and the X- and Y-axes control unit 13 are controlled by a computer 14. The units precluding a power sourse, the control units and the computer are housed in a shielding box 24.

In the apparatus, the X-Y stage 3 supporting the memory 5, coarse movement control unit 11 and optical microscope 25 are comprised of the positioning means for positioning the tip portion of the needle 8 close to a surface of the memory 5. The scanning means for scanning the tip portion of the needle over the surface of the memory comprises the X- and Y-axes control unit 13. The distance controlling means for controlling a distance between the tip portion of the needle and the surface of the memory while the tip portion of the needle scans thereover comprises the coarse movement control unit 11 and Z-axis control unit 12.

(Embodiment 2)

Figure 2:
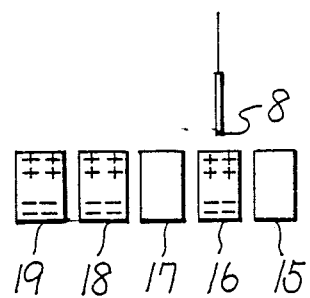
FIGS. 2 through 6 are enlarged schematic diagrams each showing a needle tip and a part of a memory according to second through sixth embodiments of the invention.

In this embodiment, while using the apparatus as used in the first embodiment, a dielectric material is used for the memory 5 and the data stored therein is read out by an electrically conductive needle 8. FIG. 2 is an enlarged schematic view showing a part of the memory 5 and the needle 8 of the memory reading device in accordance with the second embodiment. The memory cells 5(15 through 19) are made of a dielectric material, in which data is stored in the form of polarization or depolarization of the dielectric material. When the electrically conductive needle is closely positioned over the surface of the memory 5, a current flows in the needle when the dielectric material is polarized(16, 8, 19) due to a tunnel effect, whereas the current flow is lesser in the case of depolarization of the dielectric material(15, 17). In this manner, the reading of data out of the memory is taken place on an atomic scale.

(Embodiment 3)

Figure 3:
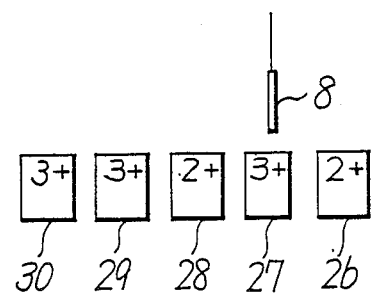

In this embodiment, while using the apparatuse as used in the first embodiment, an element which has some valencies is used for the memory 5 and data stored therein is read out by an electrically conductive needle 8. FIG. 3 is an enlarged schematic view showing a part of the memory 5 and the needle 8 of the memory reading device in accordance with the third embodiment. The element having some valenies stores data on an atomic scale in the form of a difference in numbers of electric charges that a single atom possesses. When the electrically conductive needle is closely positioned over the surface of the memory 5, a large amount of current flows in the needle due to a tunnel effect in the case of atoms (27, 29, 30) each having a large number of electric charges. On the other hand, the current flow in the needle is lesser in the case of atoms (26, 28) each having reduced number of electric charges. The reading of data out of the memory is thus taken place on an atomic scale.

(Embodiment 4)

Figure 4:
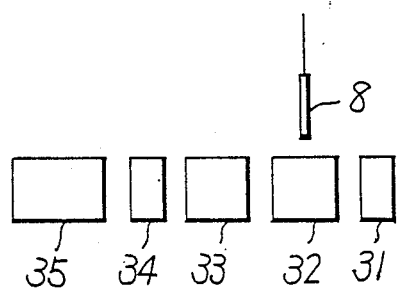

In this embodiment, while using the apparatus as used in the first embodiment, a superlattice is used for the memory 5, and the data stored in the memory 5 is read out by using an electrically conductive needle 8. FIG. 4 is an enlarged schematic view showing a part of the memory 6 and the needle 8 of the memory reading device according to the fourth embodiment. The memory (31 through 35) stores data on an atomic scale in the form of a configuration of elements of different kinds. When the electrically conductive needle is closedly positioned over the surface of the memory, a tunnel current flows. A size of an electron cloud is given by the measurement of the tunnel current. Each of the elements of different kinds has a specific size of the electron cloud, whereby the reading of data out of the memory can thus be taken place on an atomic scale.

(Embodiment 5)

Figure 5:
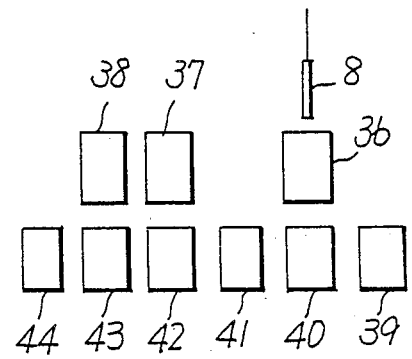

In this embodiment, while using the apparatus as used in the first embodiment, an electrically conductive substance is used for the memory 5 and data stored therein is read out by an electrically conductive needle 8. FIG. 5 is an enlarged schematic view showing a part of the memory 5 and the needle 8 of the memory reading device in accordance with the fifth embodiment. The memory 5 stores data on an atomic scale in the form of a difference in a film thickness in the direction perpendicular to the memory surface. The film thickness differs depending upon positions on the surface of the memory by one to several atoms of an electrically conductive element. When the electrically conductive needle is closely positioned over the surface of the memory 5 a tunnel current flows. The level of the tunnel current is a function of a distance between the probe tip of the needle and the surface of the memory 5. Therefore, the reading of the data out of the memory 5 is taken place by the measurement of the tunnel current.

(Embodiment 6)

Figure 6:
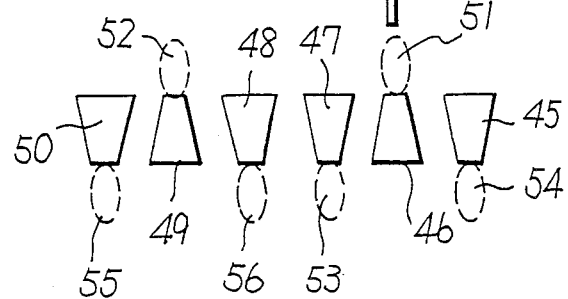

In this embodiment, while using the apparatus as used in the first embodiment, memory 5 is made of a molecule in which the orbital of a lone, or unshared, pair extends in some specific direction, and data stored therein is read out by an electrically conductive needle 8. FIG. 6 is an enlarged schematic view showing a part of the memory 5 and the needle of the memory reading device in accordance with the sixth embodiment. Data is stored on a molecular scale in the memory 5 with two types of molecules (46 through 50) which have localized lone pairs to some specific direction, in which one is that the orbital of lone pair (51, 52) is outwardly directed (46, 49) and another is that the orbital of lone pair (53 through 56) is inwardly directed. When the electrically conductive needle is closely positioned over the surface of the memory 5, a large amount of tunnel current flows in the needle when held close to the molecules (45, 49) each having the orbital of lone pair directed outwardly, because potential energy barrier between the needle and the memory is small. On the other hand, a lesser amount of tunnel current flows in the needle when held close to the molecules (47, 48, 50) each having the localized lone pair directed inwardly 9, because potential energy barrier therebetween is large. In this manner, reading of the data on a molecular scale is taken place.

(Embodiment 7)

In this embodiment, while using the apparatus as used in the first embodiment the memory 5 is made of a polar substance immersed in a polar solvent and data stored therein is read out by an electrically conductive needle 8. Data is stored on a molecular scale in the memory 5 with two types of polar substance, in which one is that the polar substance is ionized and another is that the same is not ionized. When the electrically conductive needle is flosedly positioned over such a memory 5, there is a difference in a level of a tunnel current depending upon whether or not the polar substance is ionized. In this manner, the reading of the data out of the memory is taken place on a molecular scale.

(Embodiment 8)

Figure 7:
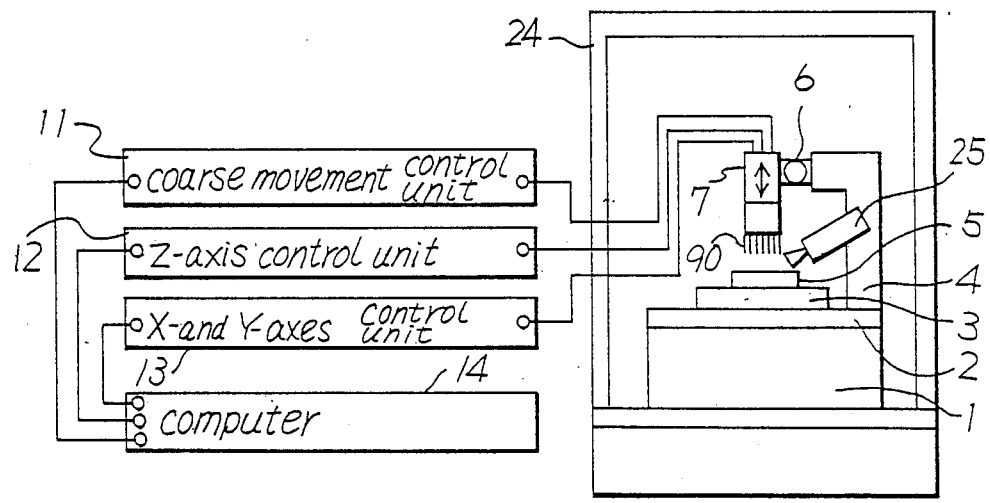
FIG. 7 is a schematic diagram showing a modified memory reading apparatus according to the present invention.

In this embodiment, a plurality of needles are used. FIG. 7 is an enlarged schematic view showing a memory reading apparatus according to this embodiment. On an anti-vibration stand 1, mounted is a fixed table 2 to which an arm 3 is fixedly secured, and to the arm 3 a needle operating unit 7 is attached. By turning a dial 6, the needle operating unit is vertically moved for carrying out Z-axis coarse positional adjustments of probe tips of a plurality of needles go relative to a memory 5. For an X-Y surface coarse movement, an X-Y stage and a coarse movement control unit 11 are provided. An optical microscope 25 attached to the arm is used at the time when the plurality of needles 90 are coarsely positioned relative to the memory 5. An operation of the unit 7 over the X-Y surface is carried out by controlling a three-dimensional piezo-electric device assembled in the needle operating unit with an X- and Y-axes control unit 13. Data stored in the memory 5 is read out by applying between the memory and the plurality of needles 90 a predetermined voltage ranging from 1 to 100 mV. The coarse movement control unit 11 -axis control unit 12 and the X- and Y-axis control unit 13 are controlled by a computer 14. The units precluding a power source, the control units (11 through 13) and the computer 14 are housed in a shielding box 24.

(Embodiment 9)

Figure 8:
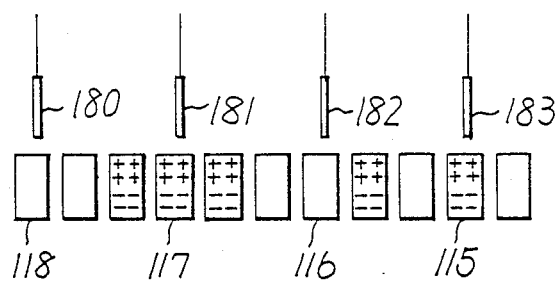
FIGS. 8 through 12 are enlarged schematic diagrams each showing some of a plurality of needle tips and a part of a memory according to ninth through thirteenth embodiments of the invention.

In this embodiment, while using the apparatus as used in the eighth embodiment, a dielectric material is used for the memory 6 and the data stored therein is read out by a plurality of electrically conductive needles 90. FIG. 8 is an enlarged schematic view showing a part of the memory and a part of the needles according to the this embodiment. The memory cells (115 through 118) are made of a dielectric material, in which data is stored in the form of polarization or depolarization of the dielectric material. When the plurality electrically conductive needles are closely positioned over the surfaces of the memory 5, a large amount of current flows in the needles (181, 183) which are held close to the polarized molecules (115, 117) due to a tunnel effect. On the other hand a lesser amount of current flows in the needles (180, 182) which are held close to the depolarized molecules (116, 118). Then needles are scanned in the X- and/or Y-axis directions on the X-Y surface to thereby measure the tunnel currents. In this manner, the reading of data out of the memory is taken place on a molecular scale.

(Embodiment 10)

Figure 9:
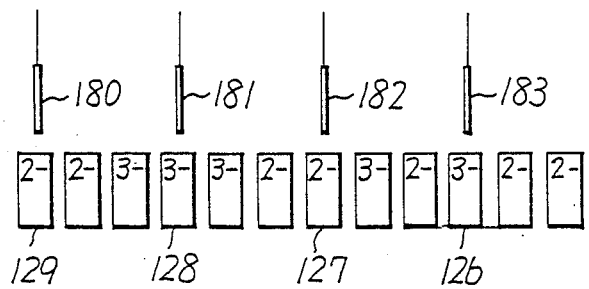

In this embodiment, while using the apparatus as used in the eighth embodiment, an element which has some valencies is used for the memory 5 and data stored therein is read out by a plurality of electrically conductive needles 90. FIG. 9 is an enlarged schematic view shown a part of the memory 5 and a part of the needles according to this embodiment. The element having some valenies stores data on an atomic scale in the form of a difference in numbers of electric charges that a single atom possesses. When the electrically conductive needles are closely positioned over the surfaces of the memory cells 5, a large amount of current flows due to a tunnel effect, in the needles (181, 183) which are held close to atoms (126, 128) each having a large number of electric charges. On the other hand, a lesser amount of current flows in the needles (180, 182) which are held close to atoms (127, 129) each having reduced number of electric charges. Then, the needles are scanned in the X- and/or Y-directions on the X-Y surface to thereby measure the tunnel currents. The reading of data out the memory is thus taken place on an atomic scale.

(Embodiment 11)

Figure 10:
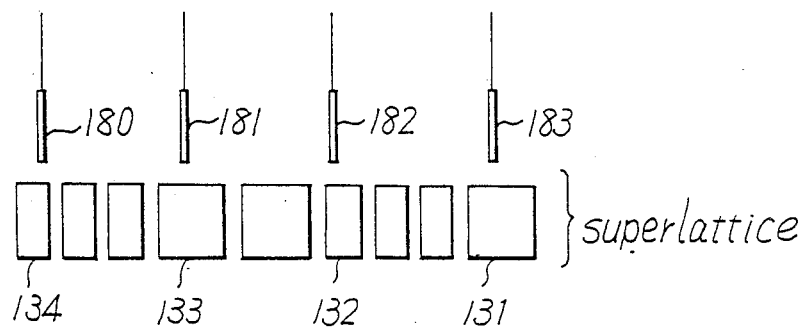

In this embodiment, while using the apparatus as used in the eighth embodIment, a superlattice is used for the memory 5, and the data stored therein is read out by using a plurality of electrically conductive needles 90. FIG. 10 is an enlarged schematic view showing a part of the memory and some of the needles according to this embodiment. The memory stores data on an atomic scale in the form of a configuration of elements of different kinds. When the electrically conductive needles are closely positioned over the surface of the memory 5, large sized atoms (131, 133) and small sized atoms (132, 134) can be discriminated from each other due to a tunnel effect. Then the needles are scanned in the X- and/of Y-directions on the X-Y surface to thereby read the data stored on a molecular scale while utilizing the tunnel effect. In this manner, the reading of data out of the memory is taken place on an atomic scale.

(Embodiment 12)

Figure 11:
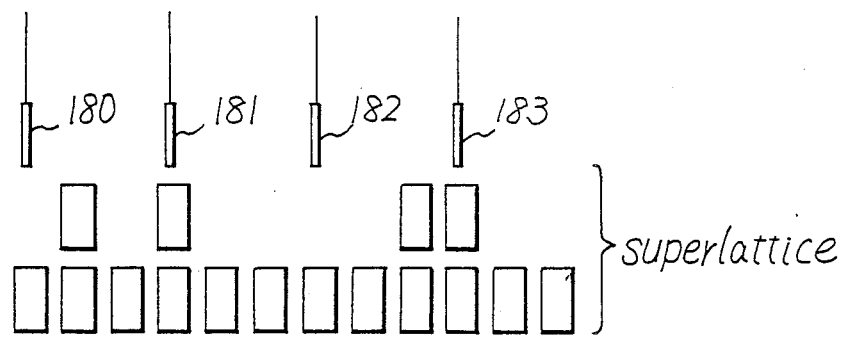

In this embodiment, while using the apparatus as used in the first embodiment, a superlattice is used for the memory 5 and data stored therein is read out by a plurality of electrically conductive needles 90. FIG. 11 is an enlarged schematic view showing a part of the memory 5 and some of the needles in accordance with this embodiment. The memory 5 stores on an atomic scale data in the form of a difference. In a film thickness in the direction perpendicular to the memory surface. The film thickness differs depending upon positions on the surface of the memory by one to several atoms of an electrically conductive element. When the electrically conductive needles are closely positioned over the surface of the memory a large amount of tunnel current flows in the needles (181, 183) which are held close to the portions where the film thickness is large, whereas a lesser amount of current flows in the needles (180, 182) which are held close to the portions where the film thickness is small. Then, the needles are scanned in the X- and/or Y-directions on the X-Y surface to thereby read data while utilizing the tunnel effect. In this manner, the reading of data out of the memory is taken place on an atomic scale.

(Embodiment 13)

Figure 12:
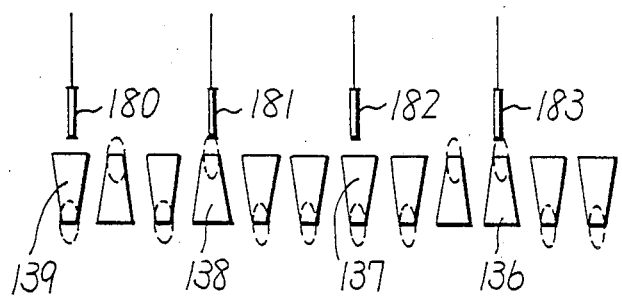

In this embodiment, while using the apparatus as used in the first embodiment, the memory 5 is made of a molecule in which the orbital of lone pair extends in some specific direction, and data stored therein is read out by a plurality of electrically conductive needles 90. FIG. 12 is an enlarged schematic view showing a part of the memory 5 and some of the needles in accordance with this embodiment. Data is stored on a molecular scale in the memory 5 with two types of molecules in which the orbital of lone pain extends in some specific direction, in which one is that the localized lone pair is outwardly directed and another is that the orbital of lone pair is inwardly directed. When the electrically conductive needles are closely positioned over the surface of the memory 5, a large amount of tunnel current flows in the needles (181, 183) held close to the molecules (136, 138) each having the the orbital of lone pair directed outwardly, because potential energy barrier between the needle and the memory is small. On the other hand, a small of tunnel current flows in the needles (180, 182) held close to the molecules (137, 139) each having the localized lone pair directed inwardly, because potential energy barrier therebetween is large. Then, the needles are scanned in the X- and/or Y-directions on the X-Y surface to thereby read the data stored on a molecular scale while utilizing the tunnel effect. In this manner, reading of the data is taken place on a molecular scale.

(Embodiment 14)

In this embodiment, while using the apparatus as used in the first embodiment, the memory 5 is made of a polar substance immersed in a polar solvent and data stored therein is read out by a plurality of electrically conductive needles go. Data is stored on a molecular scale in the memory 5 with a polar substance capable of having either one of two states at each point across the memory surface. In one state the polar substance is ionized and in the other state the substance is not ionized. When the electrically conductive needles are closely positioned over such a memory 5, there is a difference in a level of a tunnel current depending upon whether or not the polar substance is ionized. Then, the needles are scanned in the X- and/or Y-directions on the X-Y surface to thereby read the data stored on a molecular scale while utilizing the tunnel effect. In this manner, the reading of the data out of the memory is taken place.

(Embodiment 15)

Figure 13:
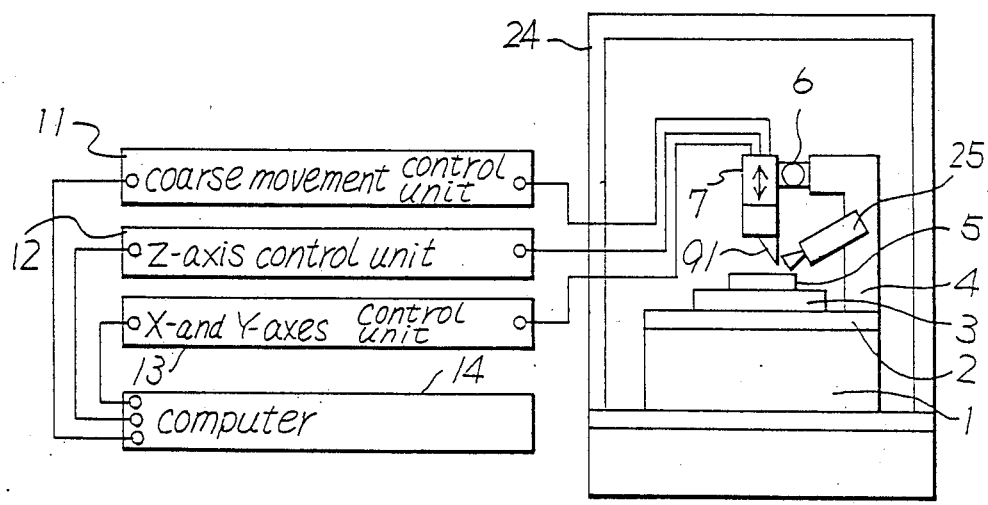
FIG. 13 is a schematic diagram showing a further modified memory reading apparatus according to the present invention.

In these embodiment, a needle having a minute tip used herein is produced using a semiconductor producing technique. FIG. 13 is an enlarged schematic view showing a memory reading apparatus according to this embodiment. On an anti-vibration stand 1, mounted is a fixed table 2 to which an arm is fixedly secured, and to the arm a needle-like device operating unit is attached. By turning a dial 6, the needle-like operating operating unit is vertically moved for carrying out Z-axis coarse positional adjustments of probe tips of a needle-like device 91 relative to a memory 5 For an X-Y surface coarse movement an X-Y stage and a coarse movement control unit 11 are provided. An optical microscope 25 attached to the arm is used at the time when the needle-like device is coarsely positioned relative to the memory 5. An operation of the unit 7 over the X-Y surface is carried out by controlling a three-dimensional piezoelectric device assembled in the needle-like device operating unit 7 with an X- and Y-axis control unit 13. Data is inputted in the memory by applying between the memory 5 and needle-like device 91 a predetermined voltage ranging from 1 to 100 mV. In the needle-like device 91, a conduction portion and an insulation portion are alternatively arranged on a semiconductor substrate. An electrically conductive needle having a tip made of one to several atoms is attached to the conductive portion. This electrically conductive needle can be produced by minutely shaping an electrically conductive layer grown on a semiconductor substrate by way of an etching processing. The coarse movement control unit 11, a Z-axis control unit 12 and the X- and Y-axis control unit 13 are controlled by a computer 14. The units precluding a power sourse, the control units (11 through 13) and the computer 14 are housed in a shielding box 24.

(Embodiment 16)

Figure 14:
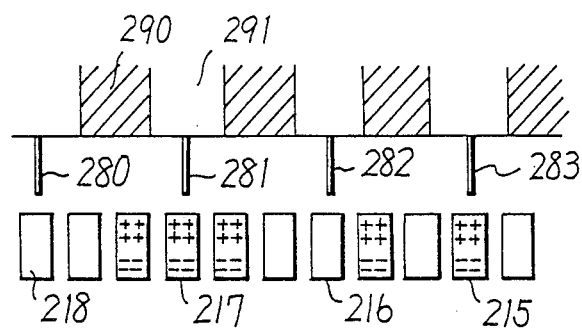
FIGS. 14 through 18 are enlarged schematic diagrams each showing some of tip portions of a needle-like device and a part of a memory according to sixteenth through twentieth embodiments of the invention.

In this embodiment, while using the apparatus as used in the fifteenth embodiment, a dielectric material is used for the memory 5 and the data stored therein is read out by electrically conductive tip portions of a needle-like device 91. FIG. 14 is an enlarged schematic view showing the tip portions of the needle-like device 91 and a part the memory according to these embodiment. The memory 15 is made of a dielectric material, in which data is stored in the form of polarization or depolarization of the dielectric material. When a minutely shaped electrically conductive tip portion attached to each of the conductive portions of the needle-like device is closely positioned over one of dielectric molecules on the surface of the memory 5, a large amount of current flows in the tip portions (281, 283) which are held close to the polarized molecules (115, 117) due to a tunnel effect. On the other hand, a lesser amount of current flows in the tip portions (280, 282) which are held close to the depolarized molecules (216, 218). Then, the needle-like device 91 is scanned in the X-and/or Y-axis directions on the X-Y surface to thereby measure the tunnel currents. In this manner, the reading of data out of the memory is taken place on a molecular scale. In FIG. 14 the reference numerals 290 and 291 indicate an insulated portion and a conductive portion, respectively

(Embodiment 17)

Figure 15:
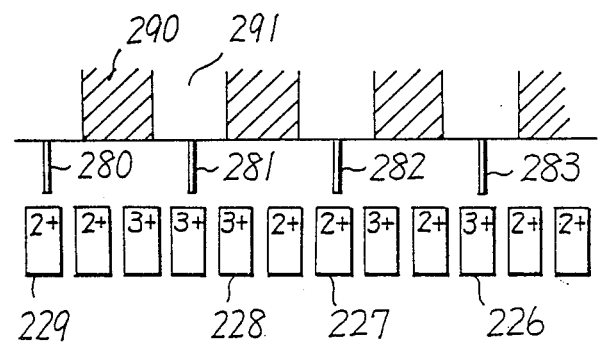

In this embodiment, while using the apparatus as used in the fifteenth embodiment, an element which has some valencies is used for the memory and data stored therein is read out by electrically conductive tip portions of a needle-like device 91. FIG. 15 is an enlarged schematic view showing the tip portions of the needle-like device 91 and a part of the memory 5 according to these embodiment. The element having some valenies stores data on an atomic scale in the form of a difference in numbers of electric charges that a single atom possesses. When a minutely shaped electrically conductive tip portions attached to each of the conduction portions of the needle-like device is closely positioned over the surface of the memory 5, a large amount of current flows due to a tunnel effect, in the electrically conductive tip portions (281, 283) which are held close to atoms (226, 228) each having a large number of electric charges. On the other hand, a lesser amount of current flows in the electrically conductive tip portions (280, 282) which are held close to atoms (227, 229) each having reduced number of electric charges. Then, the needle-like device is scanned in the X- and/or Y-directions on the X-Y surface to thereby measure the tunnel currents. The reading of data out of the memory is thus taken place on an atomic scale.

(Embodiment 18)

Figure 16:
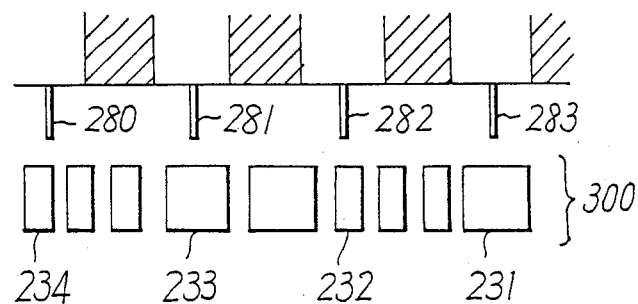

In this embodiment, while using the apparatus as used in the fifteenth embodiment, a superlattice is used for the memory 5 and the data stored therein is read out by electrically conductive tip portions of a needle-like device 91. FIG. 16 is an enlarged schematic view showing the tip portions of the needle-like device 91 and a part of the memory according to these embodiment. The memory 5 stores data on an atomic scale in the form of a configuration of elements of different kinds. When a fine electrically conductive tip portion attached to each of the conductive portions of the needle-like device is closedly positioned over the surface of the memory 5, large sized atoms (231, 233) and small sized atoms (232, 234) can be discriminated from each other due to a tunnel effect. Then, the needle-like device is scanned in the X- and/or Y-directions on the X-Y surface to thereby read the data stored on a molecular scale while utilizing the tunnel effect. In this manner, the reading data out of the memory is taken place on an atomic scale.

(Embodiment 19)

Figure 17:
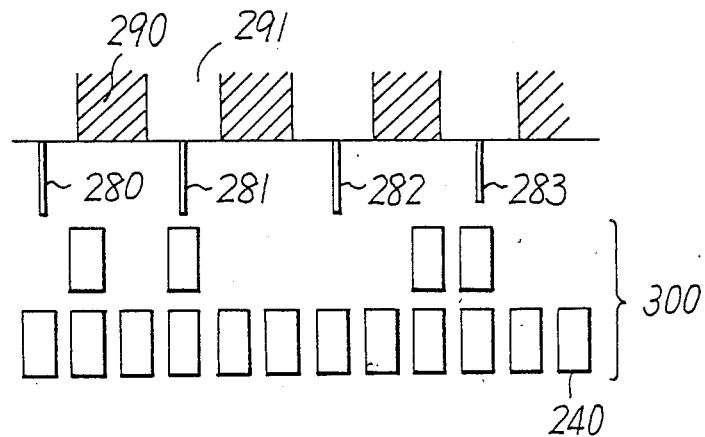

In this embodiment, while using the apparatus as used in the fifteenth embodiment a superlattice is used for the memory 6 and data stored therein is read out by an electrically conductive needle 8. FIG. 17 is an enlarged schematic view showing the tip portions of the needle-like device 91 and a part of the memory 5 in accordance with this embodiment. The memory 5 stores data of in the form a difference in a film thickness in the direction perpendicular to the memory surface. The film thickness differs depending upon positions on the surface of the memory by one to several atoms of an electrically conductive element. When a minutely shaped electrically conductive tip portion attached to each of the conduction portions of the needle-like device is closely positioned over the surface of the memory 5, a larger amount of tunnel current flows in the electrically conductive tip portions (281, 283) which are held close to the portion where the film thickness is large, whereas a lesser amount of current flows in the electrically conductive tip portion (280, 282) which are held close to the portions where the film thickness is small. Then, the needle-like device is scanned in the X- and/or Y-direction in the X-Y surface to thereby read the data while utilizing the tunnel effect. Therefore, the reading of the data out of the memory is taken place by the measurement of the tunnel current.

(Embodiment 20)

Figure 18:
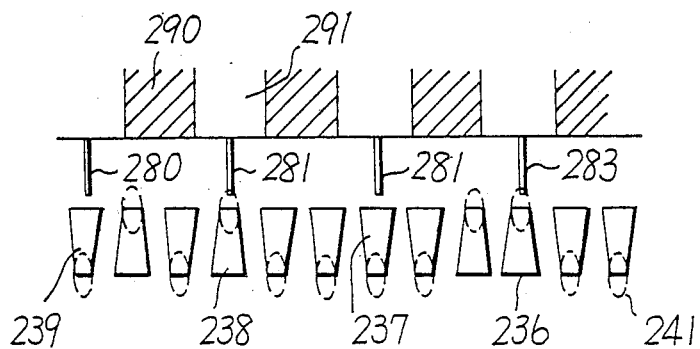

In this embodiment, while using the apparatus as used in the fifteenth embodiment, the memory 5 is made of a molecule in which the orbital of lone pair extends in some specific direction and data stored therein is read out by electrically conductive tip portions of a needle-like device 91. FIG. 18 is an enlarged schematic view showing the tip portions of the needle-like device 91 and a part of the memory 5 in accordance with this embodiment. Data is stored on a molecular scale in the memory 5 with two types of molecules in which the orbital of lone pair extends in some specific direction, in which one is that the localized lone pair is outwardly directed and another is that the orbital of lone pair is inwardly directed. When a minutely shaped electrically conductive top portion attached to each of the conductive portions of the needlelike device is closely positioned over the surface of the memory 5, a large amount of tunnel current flows in the electrically conductive tip portions (281, 283) held close to the molecules (236, 238) each having the the orbital of lone pair directed outwardly, because potential energy barrier between the tip portions and the memory is small. On the other hand, a small amount of tunnel current flows in the electrically conductive tip portions (280, 282) held close to the molecules (237, 239) each having the orbital of lone pair directed inwardly because potential energy barrier therebetween is large. Then, the needle-like device is scanned in the large and/or Y-directions on the X-Y surface to thereby read the data stored on a molecular scale while utilizing the tunnel effect. In this manner, reading of the data is taken place on a molecular scale.

(Embodiment 21)

In this embodiment, while using the apparatus as used in the fifteenth embodiment, the memory 5 is made of a polar substance immersed in a polar solvent and data stored therein is read out by electrically conductive tip portions of a needle-like device 91. Data is stored on a molecular scale in the memory 5 with two types of polar substance, in which one is that the polar substance is ionized and another is that the same is not ionized. When a minutely shaped electrically conductive tip portion attached to each of the conduction portIons of the needle-like device is closedly positioned over such a memory 5, there is a difference in a level of a tunnel current depending upon whether or not the polar substance is ionized. Then, the needle-like device is scanned in the X-and/or Y-directions on the X-Y surface to thereby read the data stored on a molecular scale while utilizing the tunnel effect.

As described above, data stored in the memory can be read out in a non-contact mode and on an atomic or molecular scale with a memory reading apparatus in accordance with the present invention which comprises at least one needle having a fine tip portion, means for positioning a surface of a memory close to the tip of the needle, means for scanning the tip of the needle over the surface of the memory, and means for controlling a distance between the tip of the needle and the surface of the memory when the tip of the needle scans thereover.

Information may be written into memory 5 in the manner disclosed in our concurrently filed application Ser. No. 07/243,512 entitled "MEMORY WRITING APPARATUS".

Memory 5 may be made of the following materials, cited by way of example:
Embodiments 2, 9, 16
DNP (1,6-bis (2,4 dinitrophenoxy) -2,4-hexadiyne.
Embodiments 3, 10, 17
Copper or iron.
Embodiments 4, 11, 12, 18, 19
A superlattice composed of Ga, As and Al.
Embodiments 6, 13, 20
Aniline.
Embodiments 7, 14, 21
Vinylidene fluoride as the polar substance in dimethyl sulfoxide as the polar solvent.

In each case, the active memory material may be in the form of a layer having a thickness of the order of several tens of Angstroms.

The, or each, sensing needle may be manufactured by known mechanical polishing or electrolytic etching techniques and preferably has a diameter of the order of 1 to 10 Å. To perform a reading operation, a needle should be brought to a distance of no greater than 10 Å from memory 5.

What is claimed is:

1. A memory reading apparatus comprising:
    an output section for reading data bits stored in a memory having a surface and constituted, at the surface, by individual segments each having an atomic or molecular scale and each having a selected one of two physical states, the value of each data bit being represented by the selected physical state of a respective segment, said output section comprising at least one needle having a fine tip portion dimensioned to address an individual memory segment; and
    control means for controlling the output section, said control means comprising means for positioning the tip portion of the needle relative to the surface of the memory, means for scanning the tip portion of the needle over the surface of the memory and means for controlling a distance between the tip portion of the needle and each individual segment at the surface of the memory while the tip portion of the needle scans thereover to effect detection of the physical state of the individual segments to thereby read a data bit from each segment.

2. A memory reading apparatus as claimed in claim 1, wherein the distance between the tip portion of the needle and the surface of the memory is maintained so as to cause a tunnel effect effective to detect the physical state of each segment.

3. A memory reading apparatus as claimed in claim 2, wherein the means for controlling a distance is operative in response to the tunnel effect occurring between the tip portion of the needle and the surface of the memory.

4. A memory reading apparatus as claimed in claim 1, wherein the needle is manufactured by using semiconductor processing techniques.

5. A memory reading apparatus as claimed in claim 1, wherein a dielectric is used as the memory.

6. A memory reading apparatus as claimed in claim 1, wherein an element which has different valencies is used as the memory.

7. A memory reading apparatus as claimed in claim 1, wherein a superlattice in which elements of different kinds are configured is used as the memory.

8. A memory reading apparatus as claimed in claim 1, wherein a superlattice in which a film thickness differs depending upon the positions in the surface of the memory is used as the memory.

9. A memory reading apparatus as claimed in claim 1, wherein molecules in which the orbital of an electron lone pair extends in a selected direction are used as the memory.

10. A memory reading apparatus as claimed in claim 1, wherein a polar compound which is immersed in a polar solvent is used as the memory.

11. A memory reading apparatus as claimed in claim 1, wherein the positioning means comprises an X-Y stage, a coarse control unit for positioning the needle in the X and Y directions and an optical microscope for examining the distance between the tip portion of the needle and the surface of the memory.

12. A memory reading apparatus as claimed in claim 1, wherein the distance controlling means comprises a coarse control section and a Z-axis control section.

13. Data storage and reading apparatus comprising:

a memory having a surface and composed of a material which is located at the surface and which is constituted by individual segments each having an atomic or molecular scale and each capable of individually assuming a physical state representing a respective data bit value;

an output section for reading the physical state of each segment corresponding to the value of a respective data bit, said output section comprising at least one needle having a fine tip portion dimensioned to address an individual memory segment in order to read the physical state of one segment at a time; and control means for controlling said output section, said control means comprising means for positioning the tip portion of the needle relative to the surface of the memory, means for scanning the tip portion of the needle over the surface of the memory and means for controlling a distance between the tip portion of the needle and each individual segment on the surface of the memory while the tip portion of the needle scans thereover to effect detection of the physical state of the individual segments to thereby read a data bit from each segment.

* * * * *